UNITED STATES PATENT OFFICE 2,402,557

GLASS SOLUTION INHIBITING

Herbert Kranich, Brooklyn, N. Y.

No Drawing. Application June 29, 1943,
Serial No. 492,721

1 Claim. (Cl. 252—109)

This invention relates to chemistry, particularly the chemistry of glass containers and especially the solubility thereof in alkaline solution.

A principal object of this invention is a method for inhibiting solution of a glass container by the liquid therein.

A further object of the invention is a method for preventing the formation of a cloudiness or precipitates in a liquid soap contained in a glass vessel.

Other objects and advantages will appear as the description of my method and its practical application with the means for carrying it into effect progresses, and the novel features will be particularly pointed out in the appended claims.

Liquids, especially liquid soaps, such as shampoo soaps, are often dispensed in glass vessels. These soaps, on standing for some time, have frequently developed a cloudiness and even a gelatinous suspended mass or precipitate therein.

After extensive investigation, I have ascertained that the soap solution dissolves the glass of the vessel, and the products resulting are what give rise to the undesirable precipitate. I have found that, in some cases, even a thin layer of glass separates from the vessel and breaking into small flakes is distributed through the liquid soap.

In accordance with my method of obviating the difficulty, I first make a batch of liquid soap. This soap is preferably made of liquid or semi-liquid vegetable fatty acids or oils combined with potassium hydroxide. I may, however, use a relatively small amount of sodium hydroxide about 5 parts potassium hydroxide to one part of sodium hydroxide. In fact, by a liquid soap, I mean one which may be made in the form of a water solution containing a substantial percentage of anhydrous soap, say 10% to 45%, and a large portion of which is a potassium soap, at least 33%.

To this batch, I add a soluble form of silica, such as a silicate. I may use ethyl silicate or potassium silicate, but I prefer to use sodium silicate. When I use sodium silicate, I employ the commercial silicate, containing about 28.5%, determined as silicon dioxide, and 8.9%, determined as sodium oxide. Of this commercial sodium silicate, I may use from 1400 pounds to 50 pounds to a batch of 70,000 pounds of liquid soap containing about 27% anhydrous soap, that is from 2.0% to 0.07%.

After adding the silicate, with stirring, the entire mass is heated to not less than 70° C. At the temperature to which the mass is heated, any metallic soaps, such as those of calcium, iron and magnesium, left as impurities in the liquid soap, redissolve, and the sodium silicate hydrolizes.

A reaction takes place in the mass of liquid soap and, probably by double decomposition, insoluble metallic silicates are formed and also insoluble meta silicic acid. This reaction is made evident upon a lowering of the temperature. When the temperature reaches approximately 50° C., a definite break, or apparent physical change occurs. When this occurs, the metallic silicates are precipitated together with any proteins which were in the original mass as soluble proteins as they in some way chemically combine with the sodium silicate or its hydrolyzed product to form insoluble proteins. The precipitates settle slowly to the bottom of the containing kettle.

By my process, I pump the liquid soap, containing the precipitates, hereinbefore referred to, to an aging kettle. The pumping breaks up the precipitates into smaller aggregates. I allow the batch to age, and slowly cool, for about one week, or longer, at atmospheric temperature to insure complete precipitation of the insolubles. Then the batch is, by refrigeration, chilled to a temperature of approximately 4° C. and kept at this temperature for approximately 48 hours.

After aging and refrigeration, I filter the entire batch, generally with a filter press.

The filtrate obtained is clear and sparkling. It contains a soluble form of silica, which I will call, ortho silicic acid, preferably, from 0.022% to about 0.016%, determined as silicon dioxide.

This finished product, containing, what may be called, a soluble form or compound of silica may be placed in a soft or a hard glass bottle and will remain clear and sparkling for a very long period, even if subjected to changing temperatures and to low temperatures approximating 4° C. In short, the finished product, after being packaged in bottles, may be safely shipped and stored on shelves of dealers and upon sale will be found to be clear and sparkling and free from any objectionable cloudiness or precipitate. It is my opinion that such a product containing a soluble form or compound of silica when placed into a glass bottle retains its clear and sparkling character, because the addition of a soluble silicate and heating probably form insoluble gelatinous meta silicic acid or compound thereof and some soluble ortho silicic acid or compound thereof. The gelatinous meta silicic acid is removed by filtration. In fact the silicic acid must be removed to such an extent that precipitating thereof will not take place at any ordinary room temperatures. The bottle in which the liquid is placed has on its inside surface a slight efflorescent layer of salts deposited during the cooling of the glass after being blown and the subsequent annealing. These salts are, generally, a mixture of sodium chloride, calcium sulphate, sodium bicarbonate, sodium sulphate and perhaps others. They dissolve readily in the liquid soap solution and probably hydrolize. At any rate, they react with the soluble silicic acid and probably form an insoluble meta silicic acid. This deposits on the surface of the glass and inhibits further solution thereof. This deposit is a very, very thin transparent jelly like film and remains so as long as the contents remain in the container. When the contents are removed and the bottle rinsed with water the gelatinous layer, upon drying, becomes firmly adherent as a transparent or opalescent film, so tenaciously clinging to the bottle that it is hard to scratch off.

It is probably also true, after the efflorescent layer has been removed, that further solution must be of a silicate itself, that is, the main substance of the bottle or glass container. This silicate probably does not dissolve not only because of the protecting film thereon but also, probably, because an equilibrium of some sort has been established, possibly, the concentration of undissociated or dissociating silicic acid or silicate in the soap solution is such as to substantially inhibit any solution of the silicate composing the glass of the container. The soap solution being to an extent dissociated, probably, restrains the dissociation of the compound or soluble form of silica. In short, the soap solution is probably saturated, under the specified condition, as far as a compound or soluble form of silica is concerned and so after the solution of the infinitesimal coating of relatively easily soluble material on the surface of the glass is accomplished and an insoluble form of silica of infinite thinness is deposited, no further solution of the glass takes place.

By my method of preparation, I am enabled to store a slightly alkaline liquid soap in a glass container for long periods of time without having a cloudiness or precipitate generated therein. I have applied my principle, practically, to liquid soaps but the principle itself, that is, the presence in a slightly alkaline liquor in a glass container of a small percentage of a soluble form of silica is applicable to any other solution or liquid not detrimentally affected, by the presence therein, of a soluble form of silica.

The pH of the soap ranges from about 8.5 to 10.5 and the silicate from about 10.8 to 11.2. A suitable alkaline liquid to be protected by the principle of my method should, preferably have a pH from about 7 to 11.

Although I have practically described my method in connection with particular physical and chemical substances, nevertheless, I desire to have it understood that the description of particular substances was illustrative only and does not exhaust the possible physical and chemical substances embraced within the scope of my invention.

What I claim as new and desire to secure by Letters Patent of the United States, is:

The method of preventing undesirable cloudiness in water solutions of potassium soaps contained in glass vessels which consists in adding between 2.0 per cent to 0.07 per cent of commercial sodium silicate to the liquid soap, then heating to at least 70° C., allowing to stand for about one week, then cooling to about 4° C., and then filtering.

HERBERT KRANICH.